Patented Jan. 4, 1927.

UNITED STATES PATENT OFFICE.

CARLETON ELLIS, OF MONTCLAIR, NEW JERSEY.

PAINT AND VARNISH REMOVER.

No Drawing.     Application filed December 12, 1923. Serial No. 680,281.

This invention relates to a finish remover comprising absolute methyl alcohol and has for its object the production of a composition particularly adapted for the removal of varnish.

The most effective commercially used paint and varnish remover at the present time is one made of approximately equal amounts of benzol and acetone, preferably the wood acetone well known throughout the trade under the name of methyl acetone, incorporated with three or four ounces of paraffin wax per gallon.

The cost of acetone and methyl acetone at times, owing to market conditions, is sufficiently high to substantially raise the cost of production of removers of this type. According to the present invention absolute or well dried methyl alcohol is used in substitution for the acetone or the more generally used methyl acetone.

The activity of a paint and varnish remover is usually tested in the trade by a means which is not absolutely reliable but nevertheless is regarded sufficiently convincing to the user. This method involves the application of some of the removing composition to paint or varnish and to note the time taken for the surface to wrinkle. This wrinkling effect is regarded as an indication of the solvent action or "cutting" power of the removing composition.

Solvent mixtures vary greatly in cutting power. In removers involving the use of a penetrating hydrocarbon such as benzol and a loosening alcoholic solvent a very great variation is observable in the cutting action depending upon the choice of solvents. Practically speaking benzol is the best and cheapest penetrating hydrocarbon. Methyl acetone is the most readily available and effective ketone body. Such a composition with a few ounces of paraffin wax per gallon will have a cutting or softening action which may be designated by the figure 100. If the methyl acetone is replaced by ordinary 95 per cent wood alcohol the rating of remover will be in the neighborhood of say 130 (i. e. requiring 1.3 times as long to produce the softening). If ordinary 95 per cent denatured alcohol is used the rating will be say 160. These figures indicate (by inverse ratio) the relative speeds, the methyl acetone remover being the most active.

If however absolute or well dried methyl alcohol is substituted for methyl acetone I have noted the speed of removal approximates 100, generally ranging between 100 and 110. That is the absolute methyl alcohol yields a removing composition having substantially the same cutting speed as the much desired and widely used methyl acetone removing composition.

A suitable composition under my invention may be made by mixing 5 gallons of absolute methyl alcohol with 5 gallons of benzol and incorporating 4 pounds of paraffin wax by warming. The mixture may be made in various other ways. Ceresin and other waxes may be used. Also nitrocellulose, celluloid scrap and similar thickeners when desired.

The proportion of absolute methyl alcohol and benzol may vary. For a composition having a more active solvent effect on shellac the proportion of methyl alcohol may be increased. On oil varnishes a somewhat higher proportion of benzol is frequently desirable.

Other solvents preferably of an absolute or well dried character may be added in small amounts or even in quite substantial quantities without altering the utility of the remover for many purposes, the essential feature of which is that of the utilization of absolute or well dried methyl alcohol and the avoidance of introduction of solvents containing substantial amounts of water so as to impair the cutting qualities of the water free or dehydrated mixture.

In some cases ordinary wet methyl alcohol may be mixed with benzol and dried by the addition of quick lime or magnesium powder or other drying agent.

In addition to benzol, other hydrocarbons such as toluol, xylol or other appropriate wax solvent may be employed in some cases but as indicated benzol is generally speaking the most satisfactory. While I refer to anhydrous solvents and anhydrous compositions I do not wish to infer that the presence of the merest trace of water would place a composition containing it outside of the claims herein set forth. The discovery involved in the present invention resides in the fact that by using a solvent mixture, free or substantially free from water, which solvent mixture contains methyl or wood alcohol as an essential constituent, removing compositions can be made lower in cost than those prepared in the generally accepted way from benzol and methyl acetone but which nevertheless have approximately the same degree of activity.

One way of producing an anhydrous product is to make a mixture of say equal parts of benzol and 97 per cent methyl alcohol or a mixture in any other proportion desired and to dry this composition by the addition of metallic sodium in an amount requisite to unite with the water present. If an alkaline removing composition is desired this mixture may be used without neutralization but ordinarily it is desirable to add sulphuric acid anhydrid just sufficient to neutralize the alkalinity. The sodium sulphate may be removed by filtration leaving a solvent mixture practically free from water. The wax or other solid retardant of evaporation may be incorporated with this co-dried solvent mixture. In case stronger acid substances or substances engendering strong mineral acids for example are used for drying purposes the acidity is best neutralized by the addition of a suitable base. Mineral acids or any other strong acid which has a corrosive effect on wood and on containers should be avoided.

It should be noted that the solvents employed in this remover exert their best effect only when chosen with reference to miscibility. It is known of course that alcohol containing more than a certain proportion of water will not mix with benzol or in any event some separation occurs. On the other hand when the solvents are completely dry the highest degree of miscibility is attained. Under these conditions the co-operating effect, that is the joint penetrating and loosening action desired in such composite solvents apparently reaches its maximum. Intermediate stages of moisture content affect the miscibility, not necessarily in a manner apparent to the eye, but in some way which apparently tends to reduce the co-operative effect of the solvents conducive to most rapid cutting action.

In the case of solvent mixtures which are apparently miscible but which by virtue of some incompatible element are in a state of fictitious miscibility, slight disturbing influences may bring about separation with big impairment of activity of the removing composition. In making organic solvent mixtures containing caustic alkali particularly for the purpose of producing a remover for baked japan or baked enamel coatings the observation has been made that methyl alcohol saturated with caustic alkali does not mix with benzol. Methyl alcohol treated with metallic sodium yields an alkaline solution which does mix with benzol. The addition of wax however causes separation.

In a similar manner compositions which are fictitiously miscible may on exposure when the remover is applied, absorb moisture or the composition may be affected by the solution of some of the constituents of the paint or varnish coating which is undergoing removal and in this way the condition of fictitious miscibility may result in actual separation and impairment of the cutting speed.

In the preferred form of remover chlorinated solvents such as carbon tetrachloride or trichlorethylene are not desired. These solvents are capable of suppressing the inflammability of certain solvents but do not operate effectively on methyl alcohol. So great a proportion of such chlorinated solvents would be required to overcome the inflammability of methyl alcohol that the proportion of the alcohol would not be such as to make an effective remover. The composition prepared hereunder in the preferred form therefore has inflammable qualities. Also it is preferably free from soaps, ammonia and mineral salts such as calcium chloride or magnesium chloride which take up (or combine with) alcohol to form crystalline compounds. The claims of the present invention do not comprehend removers of the so-called "carbolic acid" type.

In fact I prefer to use as the sole solvents benzol and anhydrous methyl or denatured alcohol incorporated with mineral wax, namely paraffin or ceresin wax, the proportion of wax being ordinarily not over 4 or 5 per cent. Deviations from this formula which do not greatly alter its activity are (1) Replacement of part of the benzol by toluol or even xylol. The heavier aromatic hydrocarbon solvents are however not as useful. (2) Replacement of part of the methyl alcohol by well dried acetone or methyl acetone. The expression "lower alcohol having a boiling point below that of benzol" is intended to cover methyl and denatured alcohols, and is to be so construed. Thus a composition may be made from two parts by volume of benzol to one part of absolute methyl alcohol and one part of methyl acetone. The solvent mixture carrying about five per cent of paraffin wax.

In making a composition containing co-dried solvents it should be borne in mind that methyl acetone usually contains some methyl acetate and drying with sodium may bring about saponification of this ester. It is recommended that alkaline agents be used for the dehydration of methyl alcohol, and that methyl acetone, if it is to be used, be dried in some other manner.

In several of my previous patents relating to paint and varnish remover I have used the term "substantially non-aqueous solvents" meaning solvents of the organic type but not necessarily free from water, the term being used rather to indicate the composition was not made up largely of aqueous agents such as aqueous caustic soda solution and the like. In the present application the term "substantially anhydrous" is used to indicate a special degree of dehydration and to distinguish from the term "substantially non-aqueous solvents". Methyl alcohol of 95 to 97 per cent could be regarded as substantially non-aqueous but it would not be substantially anhydrous. A degree of water elimination corresponding to 99 per cent and preferably 99½ per cent is desired in removing compositions falling within the preferred embodiment of the present invention.

I do not herein specifically claim the use of ethyl alcohol in removers of the kind herein described, such subject matter being covered specifically in my copending case 682,066 filed December 21, 1923.

What I claim is:—

1. A paint and varnish removing composition comprising a substantially anhydrous mixture of methyl alcohol and an aromatic hydrocarbon of the benzene series which is a wax solvent, incorporated with wax such product being substantially free of phenols.

2. A paint and varnish removing composition consisting of a substantially anhydrous mixture including a lower aliphatic alcohol, an aromatic solvent hydrocarbon and wax, said composition being substantially free from chlorinated hydrocarbons, phenols, ammonia and such mineral salts as would combine with the alcohol to form crystalline compounds.

3. A paint and varnish removing composition comprising wax, benzol, substantially absolute methyl alcohol and substantially anhydrous methyl acetone, such composition being free from such bodies as, in the presence of moisture, are corrosive to the skin.

4. A substantially anhydrous paint and varnish removing composition comprising approximately equal parts of benzol and absolute methyl alcohol incorporated with a few per cent of mineral wax, such composition being free from such bodies as, in the presence of moisture, are corrosive to the skin.

5. A paint and varnish removing composition comprising approximately two volumes of benzol, one volume of methyl alcohol and one volume of methyl acetone incorporated with a few per cent of wax, such composition being substantially anhydrous.

6. A paint and varnish removing composition comprising a substantially anhydrous mixture consisting essentially of benzol and a lower alcohol having a boiling point below that of benzol, incorporated with wax, such product being substantially free of phenols.

CARLETON ELLIS.